(12) United States Patent
Dong et al.

(10) Patent No.: US 11,281,793 B2
(45) Date of Patent: Mar. 22, 2022

(54) USER PERMISSION DATA QUERY METHOD AND APPARATUS, ELECTRONIC DEVICE AND MEDIUM

(71) Applicant: PING AN TECHNOLOGY (SHENZHEN) CO., LTD., Guangdong (CN)

(72) Inventors: Chao Dong, Shenzhen (CN); Yaozhang Chen, Shenzhen (CN); Junfei Song, Shenzhen (CN); Yongjia He, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 795 days.

(21) Appl. No.: 16/099,672

(22) PCT Filed: Sep. 29, 2017

(86) PCT No.: PCT/CN2017/104532
§ 371 (c)(1),
(2) Date: Nov. 7, 2018

(87) PCT Pub. No.: WO2019/033519
PCT Pub. Date: Feb. 21, 2019

(65) Prior Publication Data
US 2021/0224412 A1   Jul. 22, 2021

(30) Foreign Application Priority Data
Aug. 17, 2017   (CN) .......................... 201710707849.6

(51) Int. Cl.
*G06F 7/04*   (2006.01)
*H04N 7/16*   (2011.01)
(Continued)

(52) U.S. Cl.
CPC ...... *G06F 21/6227* (2013.01); *G06F 16/2282* (2019.01); *G06F 16/248* (2019.01);
(Continued)

(58) Field of Classification Search
CPC ........... G06F 21/6227; G06F 16/24553; G06F 16/2282; G06F 16/288; G06F 16/248; G06F 21/602; G06F 21/604
(Continued)

(56) References Cited

U.S. PATENT DOCUMENTS 6,279,007 B1 * 8/2001 Uppala ............... G06F 16/9027
2008/0147612 A1 * 6/2008 Gryaznov ............. G06F 21/564
(Continued)

FOREIGN PATENT DOCUMENTS

CN   104573430   4/2015
CN   104636643 A   5/2015
(Continued)

OTHER PUBLICATIONS

Data Security and Integrity in Cloud Computing Based on RSA Partial Homomorphic and MD5 CryptographyPriyanka Ora; ; IEEE: 2005; 1-6.*
(Continued)

*Primary Examiner* — Monjur Rahim
(74) *Attorney, Agent, or Firm* — Loza & Loza, LLP

(57) ABSTRACT

A user permission data query method which includes obtaining a first data table including staff identification numbers and departments corresponding to the staff identification numbers, and obtaining a second data table including a correspondence relationship among the staff identification numbers, roles, and administration authority information; obtaining, from the second data table, a plurality of data records having the same staff identification number and the same role, calculating an MD5 value corresponding to the
(Continued)

staff identification number and the role; screening various MD5 values that are different from each other, and obtaining the management departments and the management staffs respectively corresponding to the various MD5 values obtaining a MD5 value corresponding to the permission query request and determining the management departments and the management staffs corresponding to the MD5 value as permission data of a user, when a permission query request is received.

18 Claims, 5 Drawing Sheets

(51) Int. Cl.
  *G06F 21/62* (2013.01)
  *G06F 16/2455* (2019.01)
  *G06F 16/22* (2019.01)
  *G06F 16/28* (2019.01)
  *G06F 16/248* (2019.01)
  *G06F 21/60* (2013.01)

(52) U.S. Cl.
  CPC ...... *G06F 16/24553* (2019.01); *G06F 16/288* (2019.01); *G06F 21/602* (2013.01); *G06F 21/604* (2013.01)

(58) Field of Classification Search
  USPC .......................................................... 726/26
  See application file for complete search history.

(56) References Cited

U.S. PATENT DOCUMENTS

| | | | |
|---|---|---|---|
| 2012/0036133 A1* | 2/2012 | Chen | G06F 16/9014 707/747 |
| 2012/0173510 A1* | 7/2012 | Risvik | G06F 16/325 707/711 |
| 2013/0332484 A1* | 12/2013 | Gajic | G06F 16/20 707/770 |
| 2014/0282586 A1* | 9/2014 | Shear | G06F 16/24575 718/104 |
| 2015/0288669 A1* | 10/2015 | Litoiu | G06F 16/9038 726/4 |
| 2016/0098573 A1* | 4/2016 | Yankovskiy | G06F 16/283 726/27 |
| 2017/0344749 A1* | 11/2017 | Yang | G06F 16/9535 |

FOREIGN PATENT DOCUMENTS

| | | |
|---|---|---|
| CN | 106055967 | 10/2016 |
| CN | 106228059 | 12/2016 |
| CN | 106384057 | 2/2017 |
| JP | 2008123124 A | 5/2008 |
| JP | 2001051902 A | 9/2009 |
| JP | 2009238191 A | 10/2009 |

OTHER PUBLICATIONS

Office Action in corresponding Japanese Patent Application No. dated Oct. 10, 2019.

* cited by examiner

USER PERMISSION DATA QUERY METHOD AND APPARATUS, ELECTRONIC DEVICE AND MEDIUM

CROSS-REFERENCE TO RELATED APPLICATIONS

The present application is the U.S. national stage of International Patent Application No. PCT/CN2017/104532, filed on Sep. 29, 2017, which claims the benefit of priority of Chinese Patent Application No. 201710707849.6, entitled "USER PERMISSION DATA QUERY METHOD AND TERMINAL DEVICE", filed with State Intellectual Property Office on Aug. 17, 2017. The content of the foregoing applications is incorporated herein by reference in its entirety.

TECHNICAL FIELD

The present application relates to the technical field of data management, and particularly, to a method and a device for user permission data query, an electronic device and a medium.

BACKGROUND

In order to enable different users of a human resources system to have different information administration authority, in a database called by the human resources system, a plurality of data tables such as a user table, a role table, and a role permission table are usually established in advance. When a user issues an information management request in the human resource system, such as a staff information query request, the database needs to crawl, from the associated multiple data tables, each department and each staff searchable by the user in the permission range in real time in a mode of traversing a tree recursively. Specifically, the role permission table stores the correspondence relationship among roles and management departments, and since there may be a plurality of subordinate departments under one management department, the same role will exist in a plurality of data records in the role permission table. If the user needs to query staff information of multiple departments, the role of the user needs to be determined first in the role table. Then, in the role permission table, each management department corresponding to this role, including subordinate departments, needs to be found in each data record in real time. For each of these departments, staffs belonging to the department are also screened one by one in the user table to determine the staffs who are screened as staffs whose personal information can be viewed by the user.

However, as the scale of an enterprise continues to expand, if the human resource system needs to manage the information of tens of thousands of staffs, and the users of the system need to have personal information administration authority, the amount of data in the above multiple data tables will be very large. For example, although different users have different roles, different roles are often set with the same department administration authority, so there will be multiple repeatedly set permission data in the data tables. In addition, in the case that multiple users with the same permission issue a data query request, every time it is necessary to recursively traverse the tree again to determine the users' administration authority in real time, that is, every time it is necessary to repeatedly traverse each data table with a large amount of data. Therefore, the existing database and human resource system are faced with more serious performance problems, thereby making the query efficiency of the user permission data relatively low.

SUMMARY

In view of this, an embodiment of the present application provides a user permission data query method and device, an electronic device and a medium, which aims at solving the problem in the related art that performances of database and system are poor and permission data query efficiency is low due to excessive staff information.

A first aspect of an embodiment of the present application provides a user permission data query method which includes:

obtaining a first data table including staff identification numbers and departments corresponding to the staff identification numbers, and obtaining a second data table including a correspondence relationship among the staff identification numbers, roles, and administration authority information, where the administration authority information includes management departments;

obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table;

screening and obtaining various MD5 values that are different from each other, and obtaining management departments and management staffs respectively corresponding to the screened various MD5 values based on the first data table, the second data table, and the third data table;

obtaining an MD5 value corresponding to the permission query request when a permission query request based on any user is received;

searching for the management departments and the management staffs corresponding to the MD5 value of the permission query request from the management departments and the management staffs respectively corresponding to the screened various MD5 values to determine the search result as permission data of the user.

A second aspect of an embodiment of the present application provides a user permission data query device which includes:

a first obtaining module configured to obtain a first data table including staff identification numbers and departments corresponding to the staff identification numbers, and obtain a second data table including a correspondence relationship among the staff identification numbers, roles, and administration authority information, where the administration authority information includes management departments;

a calculation module configured to obtain, in the second data table, a plurality of data records having the same staff identification number and the same role, process the administration authority information in the plurality of data records by using a preset algorithm to obtain an MD5 value, and store the correspondence relationship among the staff identification number, the role, and the MD5 value in a third data table;

a screening module configured to screen and obtain various MD5 values that are different from each other, and obtain the management departments and the management staffs respectively corresponding to the screened various MD5 values based on the first data table, the second data table, and the third data table;

a second obtaining module configured to obtain an MD5 value corresponding to a permission query request, when the permission query request based on any user is received; and a search module configured to search for the management departments and the management staffs corresponding to the MD5 value of the permission query request from the management departments and the management staffs respectively corresponding to the screened various MD5 values to determine the search result as permission data of the user.

A third aspect of an embodiment of the present application provides an electronic device including a memory and a processor, where the memory stores a computer readable instruction executable on the processor, and when the computer readable instruction is executed by the processor, the steps of the user permission data query method as provided by the aforementioned first aspect are implemented.

A fourth aspect of an embodiment of the present application provides a computer readable storage medium which stores a computer readable instruction, and when the computer readable instruction is executed by at least one processor, the steps of the user permission data query method as described in the aforementioned first aspect are implemented.

In an embodiment of the present application, MD5 values corresponding to each staff identification number and its role are calculated by using administration authority information in a plurality of data records having the same staff identification number and the same role, an MD5 value that is not repeated therein is screened, and management departments and management staffs corresponding to the screened MD5 value are obtained in advance, so that when a permission query request is received, management departments and management staffs based on a tree data structure are quickly obtained from administration authority data corresponding to the MD5 value having a unique permission identifier and having a small data size, with no need to consume more system resources to repeatedly crawl permission data in a plurality of associated data tables, thus greatly improving the performance of the system and improving the permission data query efficiency.

BRIEF DESCRIPTION OF DRAWINGS

In order to illustrate the technical solutions in the embodiments of the present application more clearly, the accompanying drawings used for describing the embodiments or the prior art will be briefly described below. Apparently, the accompanying drawings in the following description are only some embodiments of the present application. For the ordinarily skilled one in the art, other accompanying drawings may also be obtained without paying creative labor.

DESCRIPTION OF EMBODIMENTS

In the following description, in order to describe but not intended to limit, concrete details such as specific system structure, technique, and so on are proposed, thereby facilitating comprehensive understanding of the embodiments of the present application. However, it will be apparent to the ordinarily skilled one in the art that, the present application can also be implemented in some other embodiments without these concrete details. In some other conditions, detailed explanations of method, circuit, device and system well known to the public are omitted, so that unnecessary details can be prevented from obstructing the description of the present application.

In order to explain the technical solutions of the present application, the following description will be made by way of specific embodiments.

Figure 1:
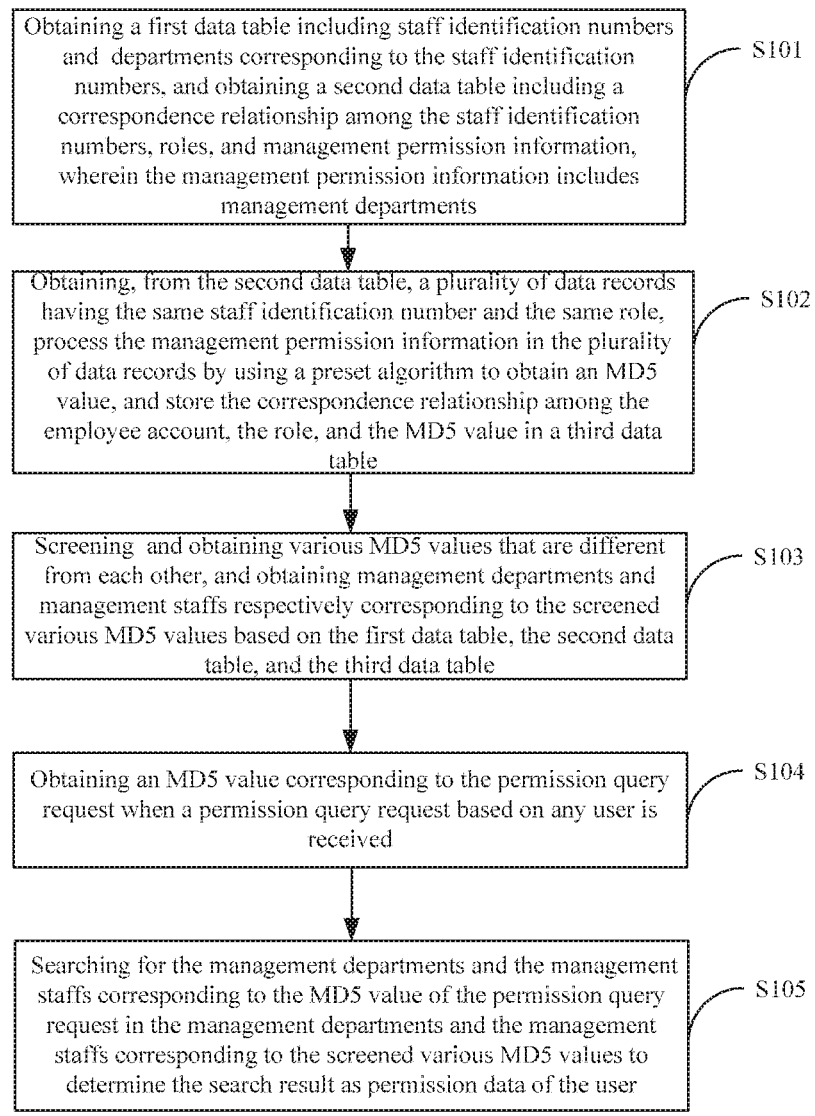
FIG. 1 illustrates an implementation flow chart of a user permission data query method according to an embodiment of the present application.

FIG. 1 illustrates an implementing flowchart of a user permission data query method according to an embodiment of the present application, and the method includes steps S101 to S105. The specific implementation principles of each step are as follows:

Step S101: obtaining a first data table including staff identification numbers and departments corresponding to the staff identification numbers, and obtaining a second data table including a correspondence relationship among the staff identification numbers, roles, and administration authority information, where the administration authority information includes management departments.

In the embodiment of the present application, the first data table is a service table. The staff identification number is used to uniquely identify a staff within an enterprise. The service table stores a correspondence relationship among each staff identification number and the department which the staff belongs to, and even stores basic information of each staff, such as staff name and staff level. See Table 1 for details:

TABLE 1

| Staff identification number | Staff name | Staff level | Department |
|---|---|---|---|
| Zhangsan | Zhangsan | 12.1 | X |
| Lisi | Lisi | 13.3 | Y |

The second data table is a user role permission table, which stores administration authority information corresponding to each role of each staff identification number. The administration authority information includes management departments, namely the departments that can be managed by a certain role of a staff identification number. Only when a staff uses a certain role to query data can the staff have department data administration authority of this role. The administration authority information of each staff and each role can be preset by a permission administrator. For example, according to the enterprise permission allocation rules, a department supervisor has data viewing permission of the department which he belongs to. Therefore, a role is set for the staff Lisa as "department supervisor" and a management department corresponding to this role is set to Y.

Illustratively, Table 2 illustrates a user role permission table. In Table 2, only the staff Lisi has the data administration authority of the department Y in the case of using the role "department supervisor".

TABLE 2

| Serial number | Staff identification number | Role | Management department |
|---|---|---|---|
| 1 | Zhangsan | Project manager | X |
| 2 | Zhangsan | Project manager | Y |
| 3 | Zhangsan | Project manager | A |
| 4 | Lisi | Supervisor | Y |
| 5 | Lisi | Supervisor | Z |
| 6 | Lisi | Project manager | X |
| 7 | Tom | Process manager | Y |
| 8 | Tom | Process manager | Z |

Step S102: obtaining, from the second data table, a plurality of data records having the same staff identification number and the same role, process the administration authority information in the plurality of data records by using a preset algorithm to obtain an MD5 value, and storing the correspondence relationship among the staff identification number, the role, and the MD5 value in a third data table.

Since each data record of the user role permission table stores only one management department, if the same role of the same staff identification number has data administration authority of a plurality of departments, a plurality of data records need to be created in the user role permission table. Therefore, in order to count all the management departments corresponding to each role of each staff identification number, a plurality of data records with the same staff identification number and the same role are first screened.

For example, in Table 2, because the staff identification number and role of the first, second, and third data records are the same, the three data records are screened; the staff identification number and the role of the fourth and fifth data records are the same, and thus the two data records are screened.

In the plurality of data records having the same staff identification number and the same role, each piece of administration authority information, namely, the management departments stored in the plurality of data records, is obtained. The pieces of administration authority information are spliced, and the spliced management departments are processed by a preset algorithm to output a 32-bit MD5 value. For example, in the first, second, and third data records in which the staff identification number and the role are the same, the obtained management departments are P0001, P0002, and P0003, and each spliced management department is P0001P0002P0003. The output value of "P0001P0002P0003" is calculated by a preset algorithm, and the output value is the MD5 value corresponding to "Zhangsan" and "Project manager".

Similarly, after the MD5 value corresponding to each role of each staff identification number is calculated, the correspondence relationship among each staff identification number, role, and MD5 value is stored in the third data table. At this time, the third data table is also referred to as a user role table. For details, see Table 3:

TABLE 3

| Serial number | Staff identification number | Role | MD5 value |
|---|---|---|---|
| 1 | Zhangsan | Project manager | 4653H |
| 2 | Lisi | Supervisor | 5683H |
| 3 | Tom | Process manager | 5683H |

Step S103: screening and obtaining various MD5 values that are different from each other, and obtaining management departments and management staffs respectively corresponding to the screened various MD5 values based on the first data table, the second data table, and the third data table.

When the MD5 value corresponding to each role of each staff identification number is calculated based on the plurality of pieces of administration authority information, the calculated MD5 value is also the same as long as the plurality of pieces of administration authority information are the same. Therefore, in the user role table, there may be two data records containing different staff identification numbers and different roles, but the MD5 value thereof is the same. The MD5 value corresponding to each role of each staff identification number represents, to a certain extent, all department administration authority owned by the role of the staff identification number. Therefore, two staff identification numbers-roles with the same MD5 value have identical department administration authority.

In the embodiment of the present application, each of MD5 values that are different from each other is screened out from the user role table, and management departments and management staffs corresponding to each screened MD5 value is determined based on the foregoing service table, the user role table, and the user role permission table. Specifically, according to each pair of staff identification numbers and roles corresponding to each MD5 value in the user role table, each management department corresponding to the pair of staff identification numbers and roles may be determined from the user permission data table, and thus in the service table, a staff identified by the staff identification number is determined as the management staff corresponding to the MD5 value based on the staff identification number corresponding to each found management department.

For example, in Table 3, after "4653" and "5683" which are two mutually different MD5 values are screened, for one of the MD5 values "4653", a pair of corresponding staff identification numbers and roles in Table 3, such as "Zhangsan" and "Project manager", can be obtained, and it is found that the management departments corresponding to "Zhangsan" and "Project manager" in Table 2 are X, Y, and A. Thereafter, in Table 1, respectively, each staff identification number belonging to department X, belonging to department Y, and belonging to department A is identified, and these staff identification numbers are determined as management staffs corresponding to MD5 value "4653", and department X, department Y, and department A are determined as the management department corresponding to the MD5 value "4653".

Step S104: obtaining an MD5 value corresponding to the permission query request when a permission query request based on any user is received.

Step S105: searching for the management departments and the management staffs corresponding to the MD5 value of the permission query request from the management departments and the management staffs respectively corresponding to the screened various MD5 values to determine the search result as permission data of the user.

After the permission data of the user is returned as the response result of the permission query request, it is ensured that the user can only query the department information or the staff information within the scope of the permission data.

In an embodiment of the present application, by storing the MD5 value corresponding to each role of each staff identification number in the user role table, it is ensured that all the administration authority information possessed by the role of the staff identification number can be recorded in a field of the data table. MD5 values corresponding to each staff identification number and its role are calculated by using administration authority information in a plurality of data records having the same staff identification number and the same role, an MD5 value that is not repeated therein is screened, and management departments and management staffs corresponding to the screened MD5 value are obtained in advance, so that when a permission query request is received, management departments and management staffs based on a tree data structure are quickly obtained from administration authority data corresponding to the MD5 value having a unique permission identifier and having a small data size, with no need to consume more system resources to repeatedly crawl permission data in a plurality of associated data tables, thus greatly improving the performance of the system and improving the permission data query efficiency.

Figure 2:
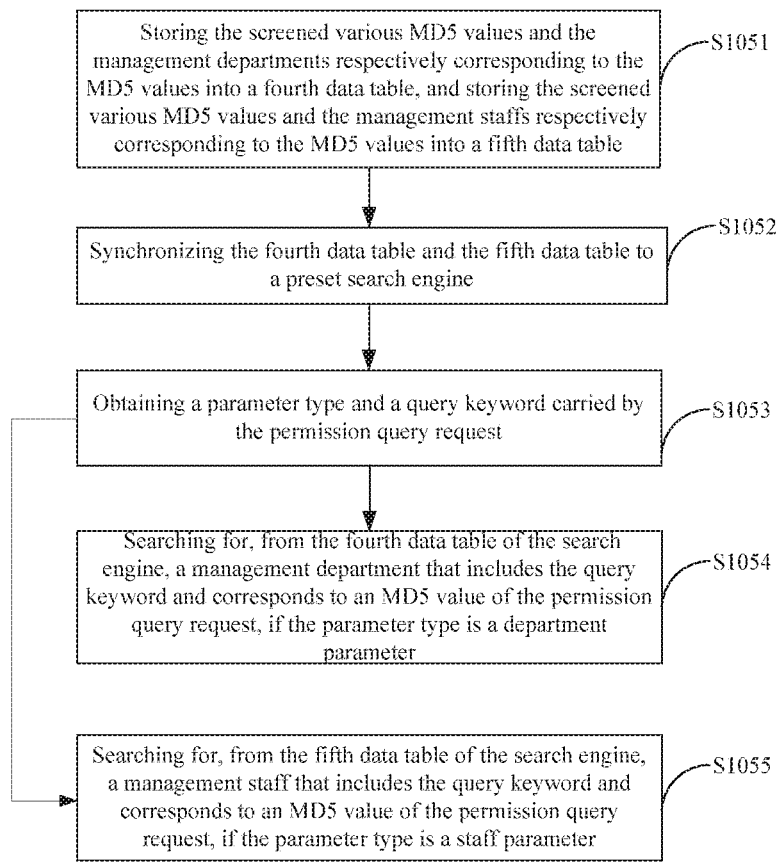
FIG. 2 illustrates a detailed implementation flow chart of step S105 of a user permission data query method according to an embodiment of the present application.

As an embodiment of the present application, as shown in FIG. 2, the foregoing step S105 specifically includes:

Step S1051: storing the screened various MD5 values and the management departments respectively corresponding to the MD5 values into a fourth data table, and storing the screened various MD5 values and the management staffs respectively corresponding to the MD5 values into a fifth data table.

In the embodiment of the present application, the fourth data table is a department brushing table, and the fifth data table is a staff brushing table. The above MD5 values that are not mutually repeated are present in the departmental brushing table and the staff brushing table. Each data record of the department brushing table stores the correspondence relationship among the MD5 value and a management department. Each data record of the department brushing table stores the correspondence relationship among the MD5 value and a management staff. Therefore, if an MD5 value corresponds to a plurality of management departments or corresponds to a plurality of management staffs, the MD5 value will exist in the plurality of data records.

Illustratively, Table 4 shows a department brushing table, and Table 5 illustrates a staff brushing table.

TABLE 4

| MD5 value | Management department |
|---|---|
| 4653 | X |
| 4653 | Y |
| 4653 | A |
| 5683 | Y |
| 5683 | Z |

TABLE 5

| MD5 value | Management staff |
|---|---|
| 4653 | Zhangsan |
| 4653 | Lisi |

TABLE 5-continued

| MD5 value | Management staff |
|---|---|
| 5683 | Zhangsan |
| 5683 | Lisi |

Step S1052: synchronizing the fourth data table and the fifth data table to a preset search engine.

In order to protect the data in the service table, the user role table, or the user role permission table from adjustment which leads to the change of permission data of any role of any staff, and the above steps S101 to S103 are repeatedly executed at preset time intervals to regenerate the above-mentioned department brushing table and staff brushing table, and the department brushing table and staff brushing table which are regenerated each time are synchronized to the preset solr search engine.

Step S1053: obtaining a parameter type and a query keyword carried by the permission query request.

Before the human resource system queries staff information or department information, the user inputs the query keyword related to the search result into a search text box. The human resource system generates a permission query request carrying a parameter type and the query keyword based on the type of the search text box that receives the query keyword, to request to obtain the permission data of the user, and returns, within the user's permission range, the staff information or department information which the users need to query. The parameter type includes a department type and a staff type. The department parameter indicates that the information which the users need to query is department information, and the staff parameter indicates that the information which the users need to query is staff information. The query keyword can be, for example, a department name or part of characters in a staff identification number.

When the permission query request sent by the human resource system is received, the parameter type and the query keyword carried by the permission query request are extracted, and it is determined whether the parameter type is a department parameter or a staff parameter.

Step S1054: searching for, from the fourth data table of the search engine, a management department that includes the query keyword and corresponds to an MD5 value of the permission query request if the parameter type is a department parameter.

Step S1055: searching for, from the fifth data table of the search engine, a management staff that includes the query keyword and corresponds to an MD5 value of the permission query request if the parameter type is a staff parameter.

Preferably, only when the department brushing table and the staff brushing table generated at the latest time have been successfully synchronized to the preset solr search engine, is the solr search engine used to search for user permission data in the department brushing table or the staff brushing table.

In the embodiment of the present application, by obtaining the parameter type carried in the permission query request, it can be determined whether the data type which the user needs to query is a staff parameter or a department parameter. By storing the management departments and the management staffs corresponding to the MD5 value in different data tables, the user permission data can be queried only in a data table matching the parameter type on the premise of knowing the parameter type that the user needs to query, and thus the magnitude of the permission data that needs to be traversed is reduced; since the Solr search engine can provide a Web interface similar to Web-service, the Solr search engine has a powerful fuzzy matching search function and can establish indexes in the department brushing table and the staff brushing table. Therefore, through the solr search engine, manage departments and manage staffs corresponding to the query keyword of the permission query request and the MD5 value can be quickly found in the department brushing table and the staff brushing table with a two-dimensional tree data structure, thereby improving the efficiency of querying user permission data.

Figure 3:
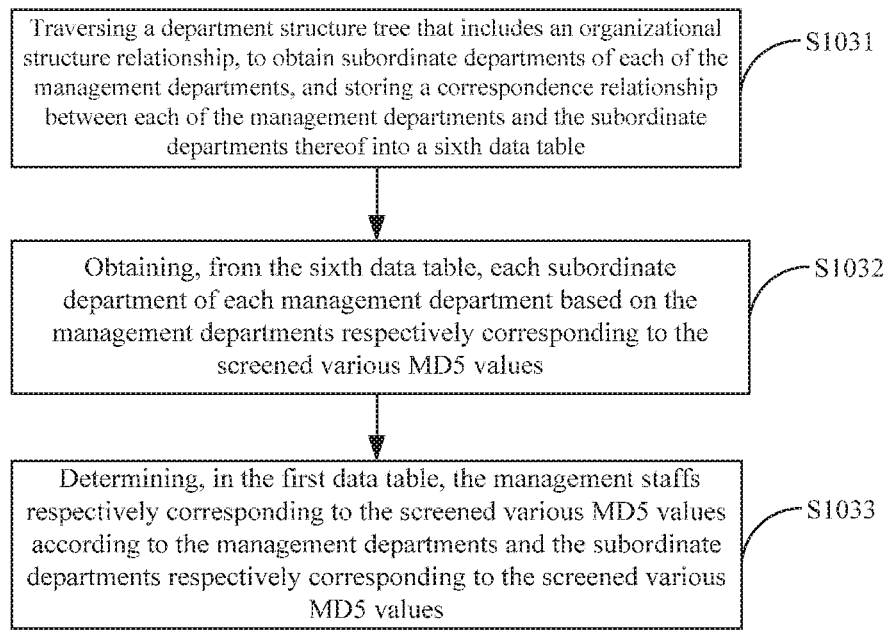
FIG. 3 illustrates a detailed implementation flow chart of step S103 of a user permission data query method according to an embodiment of the present application.

For an embodiment of the present application, FIG. 3 illustrates a specific implementation process of step S103 of a user permission data query method according to the embodiment of the present application, which is described in detail as follows:

Step S1031: traversing a department structure tree that includes an organizational structure relationship, to obtain subordinate departments of each of the management departments, and storing a correspondence relationship among each of the management departments and the subordinate departments thereof into a sixth data table.

Figure 4:
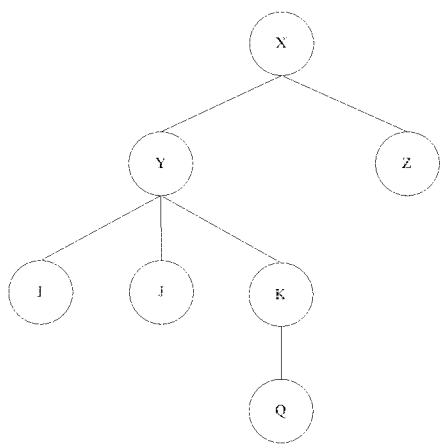
FIG. 4 illustrates a schematic diagram of a department structure tree according to an embodiment of the present application.

FIG. 4 is a schematic diagram of a department structure tree according to an embodiment of the present application. The department structure tree contains a plurality of nodes, each node represents a department, and each node forms a superior and subordinate department relationship with each sub-node of the lower layer. Therefore, the entire department structure tree reflects the organizational structure relationship within an enterprise. For example, in FIG. 4, the subordinate departments of department X include departments Y, I, J, K, and Q; the subordinate departments of department Y include departments I, J, K, and Q; and the subordinate departments of department K include department Q.

After each node of the department structure tree is traversed by the preset algorithm and the subordinate departments of each department are determined, each department and the subordinate departments thereof are stored in one record of the sixth data table, and the sixth data table constitutes a department table. As shown in Table 6:

TABLE 6

| Department | Subordinate department |
|---|---|
| X | Y |
| X | I |
| X | J |
| X | K |
| X | Q |
| Y | I |
| Y | J |
| Y | K |
| Y | Q |
| K | Q |

Step S1032: obtaining, from the sixth data table, each subordinate department of each management department based on the management departments respectively corresponding to each of the MD5 values obtained by screening.

In the user role permission table, a certain role of a staff identification number may be provided with a management department, but in fact, the data administration authority of the management department should actually include the data administration authority of each subordinate department of the management department. Therefore, it is required to determine each subordinate departments of the management department in the department table based on the management department in the user role permission table.

Step S1033: determining, in the first data table, the management staffs respectively corresponding to the screened various MD5 values according to the management departments and the subordinate departments respectively corresponding to the screened various MD5 values.

Since a staff identification number and a role collectively correspond to an MD5 value, each of the determined subordinate departments is determined to correspond to its MD5 value. For each MD5 value that is not mutually repeated, according to each corresponding management department and the subordinate departments, in the user table, each staff identification number belonging to the management department or belonging to the subordinate departments is screened, to output the staff identified by each staff identification number as the management staff corresponding to the MD5 value.

In the embodiment of the present application, by traversing the department structure tree in advance, the subordinate departments of each department can be determined, so that when the management staffs corresponding to the MD5 value is selected according to the management department of the MD5 value, each staff identification number belonging to the subordinate department can also be screened together, with no need to crawl the nodes of the department structure tree in real time to find the subordinate departments of the management department, which improves the user permission query efficiency. Moreover, by determining the management staffs corresponding to the MD5 value based on the management department and the subordinate departments, it is ensured that the scope of the permission management of each role of each staff identification number is more consistent with the actual situation, thereby improving the query accuracy of the permission data.

Figure 5:
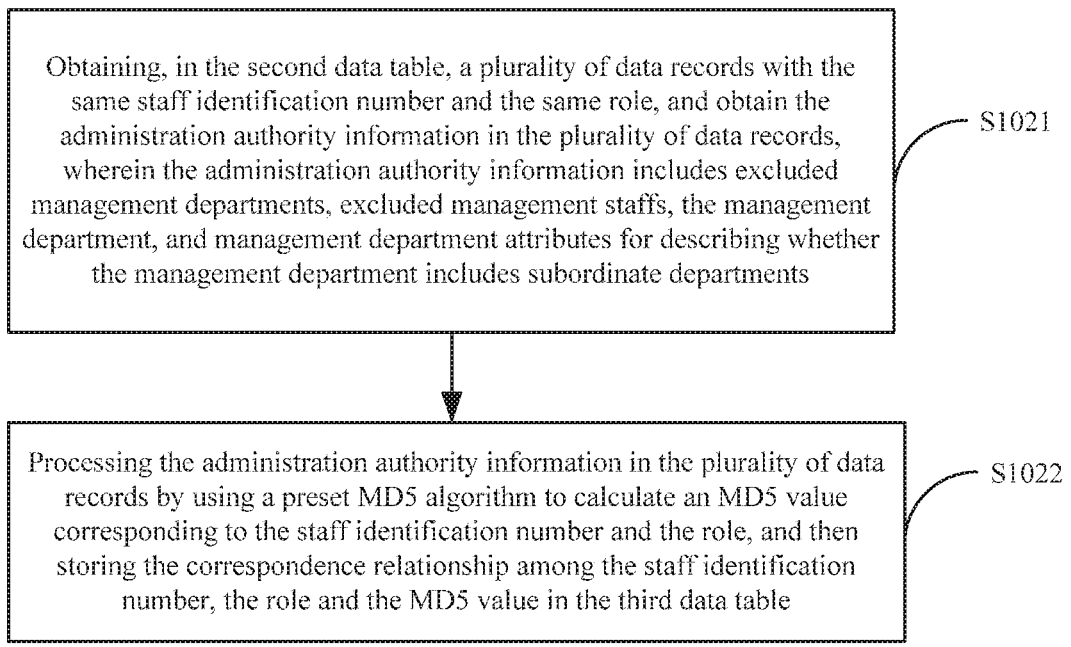
FIG. 5 illustrates a detailed implementation flow chart of step S102 of a user permission data query method according to an embodiment of the present application.

As an embodiment of the present application, as shown in FIG. 5, the foregoing step S102 specifically includes:

Step S1021: obtaining, from the second data table, a plurality of data records with the same staff identification number and the same role, and obtaining the administration authority information in the plurality of data records, where the administration authority information includes excluded management departments, excluded management staffs, the management department, and management department attributes for describing whether the management department includes subordinate departments.

In the user role permission table, administration authority information corresponding to each role of each staff identification number is recorded. The administration authority information may also be generated according to attribute values selected by a permission administrator on various fields of the permission management system.

The fields on the permission management system include management departments, management department attributes, excluded management departments, and excluded management staffs. The excluded management departments indicate subordinate departments that need to be excluded from the range of administration authority in the management department; the excluded management staffs indicate staff identification numbers that need to be excluded from the range of administration authority in the management department; the management department attributes indicate whether the department administration authority also includes the subordinate departments of the management department for the management department corresponding to each role of each staff identification number.

For example, if the permission administrator creates the staff identification number Wang and creates the role w of the staff identification number Wang, and the attribute value of the management department attribute field is "Yes", the attribute value of the excluded management department field is "Q", the attribute value of the excluded management staff field is "Lisi" and the management department is "X", in the user role permission table, the administration authority information corresponding to the staff identification number Wang and the role w includes the plurality of aforementioned attribute values, and each attribute value is respectively stored in a field of a data record where the staff identification number Wang and the role w are located.

Step S1022: processing the administration authority information in the plurality of data records by using a preset MD5 algorithm to calculate an MD5 value corresponding to the staff identification number and the role, and then storing the correspondence relationship among the staff identification number, the role and the MD5 value in the third data table.

After a plurality of data records with the same staff identification number and the same role are screened in the user role permission table, the administration authority information in each of the data records is read. The attribute values included in the administration authority information are spliced, and the spliced attribute values are processed by the preset MD5 algorithm to output the MD5 value corresponding to the staff identification number and the role.

In the embodiment of the present application, since the administration authority information includes attribute values of a plurality of fields such as management departments, management department attributes, excluded management departments, and excluded management staff, the data administration authority of each staff may be specific to designated staffs under a designated department, and thus more personalized data administration authority are set for each role of each staff identification number. The attribute value of each field is processed by the preset MD5 algorithm. In the situation that the administration authority information with a large amount of data exists, if different roles of different staff identification numbers have the same data administration authority, the storage of repeated permission data can be reduced based on MD5 values which are mutually not repeated. In the actual situation, the data volume of the repeated administration authority information is extremely large. Therefore, in the embodiment of the present application, the query efficiency of the user permission can be improved when the user permission data is determined subsequently based on the MD5 value.

Figure 6:
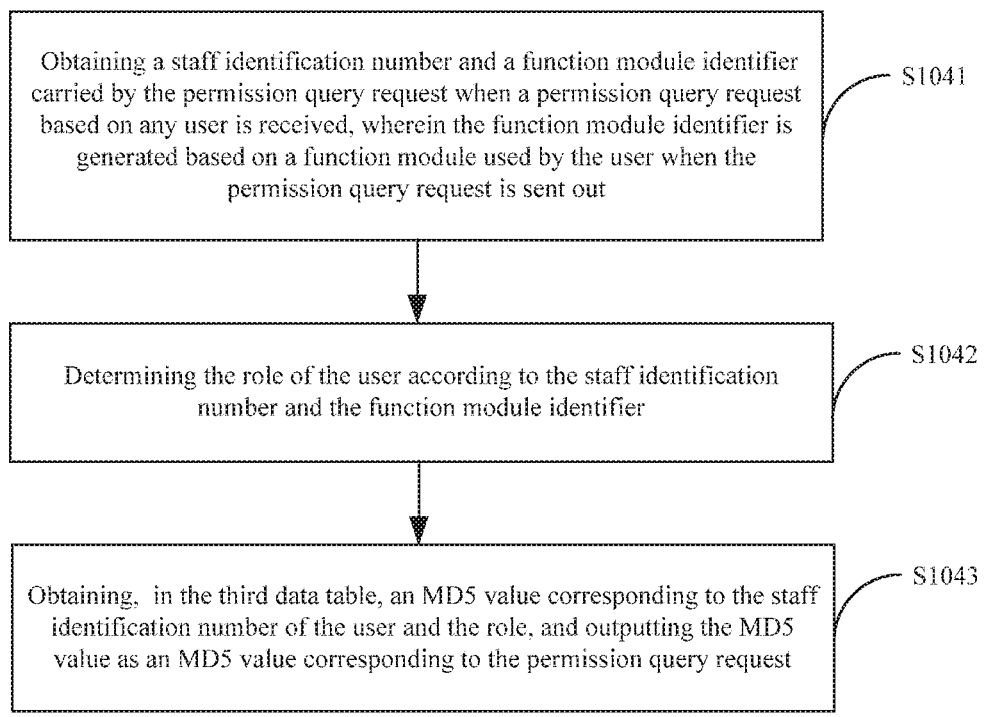
FIG. 6 illustrates a detailed implementation flow chart of step S104 of a user permission data query method according to an embodiment of the present application.

As an embodiment of the present application, on the basis of the foregoing embodiment, the manner of obtaining the MD5 value of the permission query request is further limited. As shown in FIG. 6, the above step S104 includes:

Step S1041: obtaining a staff identification number and a function module identifier carried by a permission query request when the permission query request based on any user is received, where the function module identifier is generated based on a function module used by the user when the permission query request is sent out.

The user first uses his own staff identification number to log in to the human resource system before he can query staff information or department information inside an enterprise from the human resource system. For different staff identification numbers, function modules provided by the human resource system are different, and the function modules are used to improve the entry of data query for the user. For example, for a human resource director, after logging in to his own staff identification number, he can view a report management window in the human resource system and use a report management function provided by the report management window; for a human resource specialist, when logging on to his own staff identification number, he can only view a staff information query window in the human resource system and use a staff information query function provided by the staff information query window.

Each function module is preset with a function module identifier. If the user issues an information query request in the function module, the human resource system will first generate and issue a permission query request to obtain the data permission range that the user can query. Moreover, the permission query request carries the staff identification number used by the user when he logs in to the human resource system and the function module identifier of the function module used by the user. Therefore, when the permission query request is received, the staff identification number and the function module identifier carried by the permission query request are parsed.

Step S1042: determining the role of the user according to the staff identification number and the function module identifier.

In the embodiment of the present application, the permission administrator sets, for each role of each staff identification number, the function modules that can be used by the role, where the function modules that can be used by different roles of each staff identification number are different. After the staff identification number and the function module identifier in the permission query request are obtained, the current role of the staff identification number is queried according to a table of correspondence relationship among the staff identification number, the role, and the function module identifier set in advance.

Step S1043: obtaining, from the third data table, an MD5 value corresponding to the staff identification number of the user and the role, and outputting the MD5 value as an MD5 value corresponding to the permission query request.

In the user role table, the MD5 value corresponding to the staff identification number and the role is queried according to the staff identification number and the role in the aforementioned determined permission query request.

In the embodiment of the present application, based on the principle that different roles of different staff identification numbers can use different functional modules in the human resource system, when the permission query request is received, the role used by the user currently can be determined according to the staff identification number carried by the permission query request and the function module identifier, so that an MD5 value corresponding to the permission query request can be found in the user role table. Based on the managements departments and management staffs corresponding to the MD5 value with the unique identifier, the user permission data can be quickly found, with no need to consume more system resources to repeatedly crawl a plurality of associated data tables, thereby greatly improving the system performance and improving permission data query efficiency.

It should be understood that the size of the serial numbers of the steps in the above embodiments does not mean the order of execution. The order of execution of each process should be determined by its function and internal logic, and should not be construed as limiting the implementation process of the embodiments of the present application.

Figure 7:
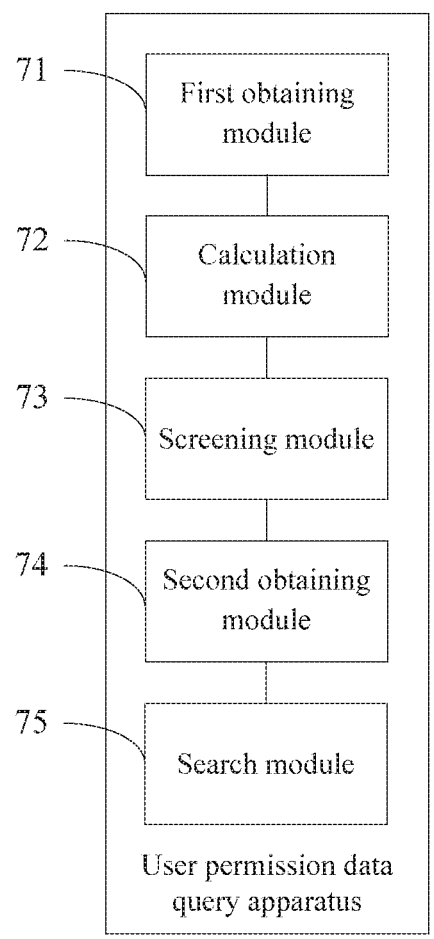
FIG. 7 illustrates a structure diagram of a user permission data query device according to an embodiment of the present application.

Corresponding to the user permission data query method of the above embodiment, FIG. 7 illustrates a structural block diagram of a user permission data query device according to an embodiment of the present application. For the convenience of description, only related parts of the embodiment of the present application are shown.

Referring to FIG. 7, the device includes:

a first obtaining module 71 configured to obtain a first data table including staff identification numbers and departments corresponding to the staff identification numbers, and obtain a second data table including a correspondence relationship among the staff identification numbers, roles, and administration authority information, where the administration authority information includes management departments;

a calculation module 72 configured to obtain, in the second data table, a plurality of data records having the same staff identification number and the same role, process the administration authority information in the plurality of data records by using a preset algorithm to obtain an MD5 value, and store the correspondence relationship among the staff identification number, the role, and the MD5 value in a third data table;

a screening module 73 configured to screen and obtain various MD5 values that are different from each other, and obtain the management departments and the management staffs respectively corresponding to the screened various MD5 values based on the first data table, the second data table, and the third data table;

a second obtaining module 74 configured to obtain an MD5 value corresponding to a permission query request, when the permission query request based on any user is received; and a search module 75 configured to search for the management departments and the management staffs corresponding to the MD5 value of the permission query request from the management departments and the management staffs corresponding to the screened various MD5 values, to determine the search result as permission data of the user.

Optionally, the search module 75 includes:

a storage sub-module configured to store the screened various MD5 values and the management departments respectively corresponding the MD5 values into a fourth data table, and store the screened various MD5 values and the management staffs respectively corresponding to the MD5 values into a fifth data table;

a synchronizing sub-module configured to synchronize the fourth data table and the fifth data table to a preset search engine;

a first obtaining sub-module configured to obtain a parameter type and a query keyword carried by the permission query request;

a first search sub-module configured to search for, in the fourth data table of the search engine, a management department that includes the query keyword and corresponds to an MD5 value of the permission query request, if the parameter type is a department parameter; and a second search sub-module configured to search for, in the fifth data table of the search engine, a management staff that includes the query keyword and corresponds to an MD5 value of the permission query request, if the parameter type is a staff parameter.

Optionally, the screening module 73 includes:

a traversing sub-module configured to traverse a department structure tree that includes an organizational structure relationship, to obtain subordinate departments of each of the management departments, and store a correspondence relationship among each of the management departments and the subordinate departments thereof into a sixth data table;

a second obtaining sub-module configured to obtain, from the sixth data table, each subordinate department of each management department based on the management departments respectively corresponding to the screened various MD5 values; and a first determination sub-module configured to determine, in the first data table, the management staffs respectively corresponding to the screened various MD5 values, according to the management departments and the subordinate departments respectively corresponding to the screened various MD5 values.

Optionally, the calculation module 72 includes:

a third obtaining sub-module configured to obtain, from the second data table, a plurality of data records with the same staff identification number and the same role, and obtain the administration authority information in the plurality of data records, where the administration authority information includes excluded management departments, excluded management staffs, the management department, and management department attributes for describing whether the management department includes subordinate departments; and a calculation sub-module configured to process the administration authority information in the plurality of data records by using a preset MD5 algorithm to calculate an MD5 value corresponding to the staff identification number and the role, and then store the correspondence relationship among the staff identification number, the role and the MD5 value in the third data table.

Optionally, the second obtaining module 74 includes:

a fourth obtaining sub-module configured to obtain, when a permission query request based on any user is received, a staff identification number and a function module identifier carried by the permission query request, where the function module identifier is generated based on a function module used by the user when the permission query request is sent out;

a second determination sub-module configured to determine the role of the user according to the staff identification number and the function module identifier; and a fifth obtaining sub-module configured to obtain, from the third data table, an MD5 value corresponding to the staff identification number of the user and the role, and output the MD5 value as an MD5 value corresponding to the permission query request.

In an embodiment of the present application, MD5 values corresponding to each staff identification number and its role are calculated by using administration authority information in a plurality of data records having the same staff identification number and the same role, an MD5 value that is not repeated therein is screened, and management departments and management staffs corresponding to the screened MD5 value are obtained in advance, so that when a permission query request is received, management departments and management staffs based on a tree data structure are quickly obtained from administration authority data corresponding to the MD5 value having a unique permission identifier and having a small data size, with no need to consume more system resources to repeatedly crawl permission data in a plurality of associated data tables, thus greatly improving the performance of the system and improving the permission data query efficiency.

Figure 8:
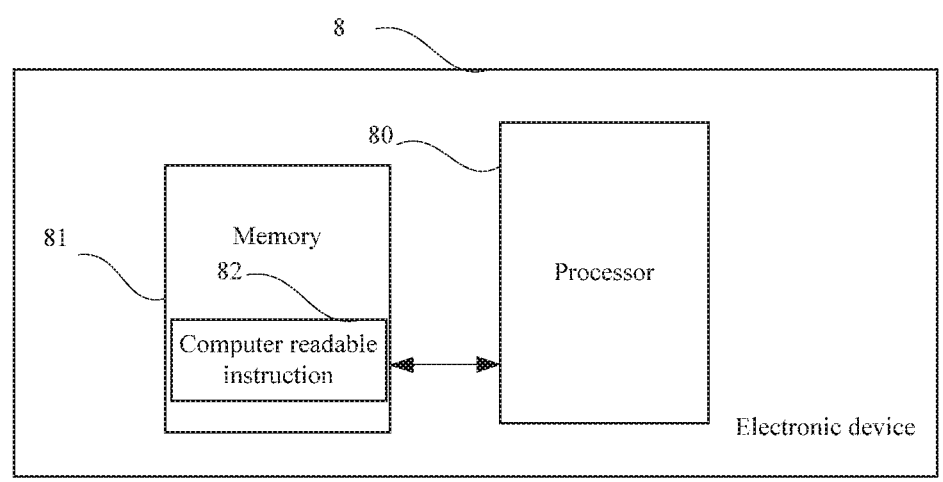
FIG. 8 illustrates a schematic diagram of an electronic device according to an embodiment of the present application.

FIG. 8 is a schematic diagram of an electronic device according to an embodiment of the present application. As shown in FIG. 8, the electronic device 8 of this embodiment includes a processor 80 and a memory 81, where the memory 81 stores a computer readable instruction 82 executable on the processor 80, such as a query program for user permission data. When the processor 80 executes the computer readable instruction 82, the steps in each foregoing embodiment of the user permission data query method, such as steps 101 to 105 shown in FIG. 1, are implemented. Alternatively, when the processor 80 implements the computer readable instruction 82, functions of each module/unit in the various device embodiments described above, such as the functions of the modules 71 to 75 shown in FIG. 7, are implemented.

Illustratively, the computer readable instruction 82 can be partitioned into one or more modules/units that are stored in the memory 81 and executed by the processor 80, to complete the present application. The one or more modules/units may be a series of computer readable instruction segments capable of performing a particular function, and the instruction segments are used for describing the execution process of the computer readable instruction 82 in the electronic device 8.

The electronic device 8 can be a computing device such as a desk calculator, a notebook, a palmtop computer, and a cloud server. The electronic device may include, but is not limited to, the processor 80, and the memory 81. It will be understood by those skilled in the art that FIG. 8 is merely an example of the electronic device 8 and does not constitute a limitation on the electronic device 8, and may include more or less components than those illustrated, or combine some components, or different components. For example, the electronic device may further include an input/output device, a network access device, a bus, and the like.

The processor 80 may be a central processing unit (CPU), or may be other general-purpose processors, a digital signal processor (DSP), an application specific integrated circuit (ASIC), a field-programmable gate array (FPGA) or other programmable logic devices, discrete gates or transistor logic devices, discrete hardware components, etc. The general purpose processor may be a microprocessor or the processor or any conventional processor or the like.

The memory 81 may be an internal storage unit of the electronic device 8, such as a hard disk or a memory of the electronic device 8. The memory 81 may also be an external storage device of the electronic device 8, such as, a plug-in hard disk disposed on the electronic device 8, a smart memory card (SMC), a secure digital (SD) card, and a flash card. Further, the memory 81 may also include both an internal storage unit of the electronic device 8 and an external storage device. The memory 81 is configured to store the computer readable instruction and other programs and data required by the electronic device. The memory 81 may also be used to temporarily store data that has been output or is about to be output.

In addition, each functional unit in each embodiment of the present application may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as an independent product, may be stored in a computer readable storage medium. Based on such understanding, the technical solution of the present application, in essence or the contribution to the prior art, or all or part of the technical solution may be embodied in the form of a software product. The computer software product is stored in a storage medium, and includes a plurality of instructions used to cause a computer device (which may be a personal computer, a server, or a network device, etc.) to perform all or part of the steps of the method described in various embodiments of the present application. The foregoing storage medium includes a USB flash disk, a mobile hard disk, a read-only memory (ROM), a random access memory (RAM), a magnetic disk, or an optical disk, and the like, which can store program codes.

As stated above, the foregoing embodiments are merely used to explain the technical solutions of the present application, and are not intended to limit the technical solutions. Although the present application has been described in detail with reference to the foregoing embodiments, the ordinarily skilled one in the art should understand that the technical solutions described in the foregoing embodiments can still be modified, or equivalent replacement can be made to some of the technical features. Moreover, these modifications or substitutions do not make the essences of corresponding technical solutions depart from the spirit and the scope of the technical solutions of the embodiments of the present application.

What is claimed is:

1. A user permission data query method, comprising:

obtaining a first data table comprising staff identification numbers and departments corresponding to the staff identification numbers, and obtaining a second data table comprising a correspondence relationship among the staff identification numbers, roles, and administration authority information, wherein the administration authority information comprises management departments;

obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table;

screening and obtaining various MD5 values that are different from each other, and obtaining management departments and management staffs respectively corresponding to the screened MD5 values based on the first data table, the second data table, and the third data table;

obtaining an MD5 value corresponding to the permission query request when a permission query request based on any user is received;

searching for the management departments and the management staffs corresponding to the MD5 value of the permission query request from the management departments and the management staffs respectively corresponding to the screened various MD5 values to determine a search result as permission data of the user, wherein searching for the management departments and the management staffs corresponding to the MD5 value of the permission query request includes:

storing each of the MD5 values obtained by screening and the management departments respectively corresponding to each of the MD5 values into a fourth data table, and storing each of the screened MD5 values and the management staffs respectively corresponding to each of the MD5 values into a fifth data table; and synchronizing the fourth data table and the fifth data table to a preset search engine.

2. The user permission data query method according to claim 1, wherein the fourth data table and the fifth data table are regenerated at preset time intervals, and wherein the step of searching for the management departments and the management staffs respectively corresponding to the MD5 value of the permission query request from the management departments and the management staffs respectively corresponding to the screened various MD5 values to determine the search result as permission data of the user comprises:

obtaining a parameter type and a query keyword carried by the permission query request after synchronizing the fourth data table and the fifth data table to the preset search engine;

searching for, in the fourth data table of the search engine, a management department that comprises the query keyword and corresponds to the MD5 value of the permission query request, if the parameter type is a department parameter; and searching for, in the fifth data table of the search engine, a management staff that comprises the query keyword and corresponds to the MD5 value of the permission query request, if the parameter type is a staff parameter.

3. The user permission data query method according to claim 1, wherein the step of screening and obtaining various MD5 values that are different from each other, and obtaining management departments and management staffs respectively corresponding to each of the screened MD5 values based on the first data table, the second data table, and the third data table comprises:

traversing a department structure tree that comprises an organizational structure relationship to obtain subordinate departments of each of the management departments, and storing a correspondence relationship among each of the management departments and the subordinate departments of each of the management departments into a sixth data table;

obtaining, from the sixth data table, subordinate departments of each of the management departments based on the management departments respectively corresponding to the screened various MD5 values; and determining, in the first data table, the management staffs respectively corresponding to the screened various MD5 values according to the management departments and the subordinate departments respectively corresponding to the screened various MD5 values.

4. The user permission data query method according to claim 3, wherein the step of obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table comprises:

obtaining, from the second data table, a plurality of data records with the same staff identification number and the same role, and obtaining the administration authority information in the plurality of data records, wherein the administration authority information comprises excluded management departments, excluded management staffs, the management department, and management department attributes for describing whether the management department comprises a subordinate department; and processing the administration authority information in the plurality of data records by using a preset MD5 algorithm to calculate an MD5 value corresponding to the staff identification number and the role, and then storing the correspondence relationship among the staff identification number, the role and the MD5 value in the third data table.

5. The user permission data query method according to claim 1, wherein the step of obtaining an MD5 value corresponding to a permission query request when the permission query request based on any user is received comprises:

obtaining a staff identification number and a function module identifier carried by the permission query request when a permission query request based on any user is received, wherein the function module identifier is generated based on a function module used by the user when the permission query request is sent out;

determining the role of the user according to the staff identification number and the function module identifier; and obtaining, from the third data table, an MD5 value corresponding to the staff identification number of the user and the role, and outputting the MD5 value as an MD5 value corresponding to the permission query request.

6. An electronic device, comprising a memory and a processor, wherein the memory stores a computer readable instruction executable on the processor, and when implementing the computer readable instructions, the processor implements the following steps of:

obtaining a first data table comprising staff identification numbers and departments corresponding to the staff identification numbers, and obtaining a second data table comprising a correspondence relationship among the staff identification numbers, roles, and administration authority information, wherein the administration authority information comprises management departments;

obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table;

screening and obtaining various MD5 values that are different from each other, and obtaining management departments and management staffs respectively corresponding to the screened various MD5 values based on the first data table, the second data table, and the third data table;

obtaining an MD5 value corresponding to the permission query request when a permission query request based on any user is received;

searching for the management departments and the management staffs corresponding to the MD5 value of the permission query request from the management departments and the management staffs respectively corresponding to the screened various MD5 values to determine the search result as permission data of the user, wherein searching for the management departments and the management staffs corresponding to the MD5 value of the permission query request includes:

storing the screened various MD5 values and the management departments respectively corresponding the MD5 values into a fourth data table, and storing the screened various MD5 values and the management staffs respectively corresponding the MD5 values into a fifth data table; and synchronizing the fourth data table and the fifth data table to a preset search engine.

7. The electronic device according to claim 6, wherein the fourth data table and the fifth data table are regenerated at preset time intervals, and wherein the step of searching for the management departments and the management staffs corresponding to the MD5 value of the permission query request from the management departments and the management staffs respectively corresponding to the screened various MD5 values to determine the search result as permission data of the user comprises:
  obtaining a parameter type and a query keyword carried by the permission query request after synchronizing the fourth data table and the fifth data table to the preset search engine;
  searching for, in the fourth data table of the search engine, a management department that comprises the query keyword and corresponds to an MD5 value of the permission query request, if the parameter type is a department parameter; and
  searching for, in the fifth data table of the search engine, a management staff that comprises the query keyword and corresponds to an MD5 value of the permission query request, if the parameter type is a staff parameter.

8. The electronic device according to claim 6, wherein the step of screening and obtaining various MD5 values that are different from each other, and obtaining management departments and management staffs respectively corresponding to the screened various MD5 values based on the first data table, the second data table, and the third data table comprises:
  traversing a department structure tree that comprises an organizational structure relationship, to obtain subordinate departments of each of the management departments, and storing a correspondence relationship among each of the management departments and the subordinate departments thereof into a sixth data table;
  obtaining, from the sixth data table, each subordinate department of each management department based on the management departments respectively corresponding to the screened various MD5 values; and
  determining, in the first data table, the management staffs respectively corresponding to the screened various MD5 values according to the management departments and the subordinate departments respectively corresponding to the screened various MD5 values.

9. The electronic device according to claim 8, wherein the step of obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table comprises:
  obtaining, from the second data table, a plurality of data records with the same staff identification number and the same role, and obtaining the administration authority information in the plurality of data records, wherein the administration authority information comprises excluded management departments, excluded management staffs, the management department, and management department attributes for describing whether the management department comprises subordinate departments; and
  processing the administration authority information in the plurality of data records by using a preset MD5 algorithm to calculate an MD5 value corresponding to the staff identification number and the role, and then storing the correspondence relationship among the staff identification number, the role and the MD5 value in the third data table.

10. The electronic device according to claim 6, wherein the step of obtaining an MD5 value corresponding to a permission query request when the permission query request based on any user is received comprises:
  obtaining a staff identification number and a function module identifier carried by the permission query request when a permission query request based on any user is received, wherein the function module identifier is generated based on a function module used by the user when the permission query request is sent out;
  determining the role of the user according to the staff identification number and the function module identifier; and
  obtaining, from the third data table, an MD5 value corresponding to the staff identification number of the user and the role, and outputting the MD5 value as an MD5 value corresponding to the permission query request.

11. A non-transitory computer readable storage medium which stores a computer readable instruction, wherein when executing the computer readable instruction, at least one processor implements the following steps of:
  obtaining a first data table comprising staff identification numbers and departments corresponding to the staff identification numbers, and obtaining a second data table comprising a correspondence relationship among the staff identification numbers, roles, and administration authority information, wherein the administration authority information comprises management departments;
  obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table;
  screening and obtaining various MD5 values that are different from each other, and obtaining management departments and management staffs respectively corresponding to the screened various MD5 values based on the first data table, the second data table, and the third data table;
  obtaining an MD5 value corresponding to the permission query request when a permission query request based on any user is received;
  searching for the management departments and the management staffs corresponding to the MD5 value of the permission query request from the management departments and the management staffs respectively corresponding to the screened various MD5 values to determine the search result as permission data of the user, wherein searching for the management departments and the management staffs corresponding to the MD5 value of the permission query request includes:
    storing the screened various MD5 values and the management departments respectively corresponding to the MD5 values into a fourth data table, and storing the screened various MD5 values and the management staffs respectively corresponding to the MD5 values into a fifth data table; and
    synchronizing the fourth data table and the fifth data table to a preset search engine.

12. The non-transitory computer readable storage medium according to claim 11, wherein the fourth data table and the fifth data table are regenerated at preset time intervals, and wherein the step of searching for the management departments and the management staffs corresponding to the MD5 value of the permission query request from the management departments and the management staffs respectively corresponding to the screened various MD5 values to determine the search result as permission data of the user comprises:
obtaining a parameter type and a query keyword carried by the permission query request after synchronizing the fourth data table and the fifth data table to the preset search engine;
searching for, in the fourth data table of the search engine, a management department that comprises the query keyword and corresponds to an MD5 value of the permission query request, if the parameter type is a department parameter; and
searching for, in the fifth data table of the search engine, a management staff that comprises the query keyword and corresponds to an MD5 value of the permission query request, if the parameter type is a staff parameter.

13. The non-transitory computer readable storage medium according to claim 11, wherein the step of screening and obtaining various MD5 values that are different from each other, and obtaining management departments and management staffs respectively corresponding to the screened various MD5 values based on the first data table, the second data table, and the third data table comprises:
traversing a department structure tree that comprises an organizational structure relationship, to obtain subordinate departments of each of the management departments, and storing a correspondence relationship among each of the management departments and the subordinate departments thereof into a sixth data table;
obtaining, from the sixth data table, each subordinate department of each management department based on the management departments respectively corresponding to the screened various MD5 values; and
determining, in the first data table, the management staffs respectively corresponding to the screened various MD5 values according to the management departments and the subordinate departments respectively corresponding to the screened various MD5 values.

14. The non-transitory computer readable storage medium according to claim 13, wherein the step of obtaining, from the second data table, a plurality of data records having the same staff identification number and the same role, processing the administration authority information in the plurality of data records by using a preset algorithm to obtain an MD5 value, and storing the correspondence relationship among the staff identification number, the role, and the MD5 value in a third data table comprises:
obtaining, from the second data table, a plurality of data records with the same staff identification number and the same role, and obtaining the administration authority information in the plurality of data records, wherein the administration authority information comprises excluded management departments, excluded management staffs, the management department, and management department attributes for describing whether the management department comprises subordinate departments; and
processing the administration authority information in the plurality of data records by using a preset MD5 algorithm to calculate an MD5 value corresponding to the staff identification number and the role, and then storing the correspondence relationship among the staff identification number, the role and the MD5 value in the third data table.

15. The non-transitory computer readable storage medium according to claim 11, wherein the step of obtaining an MD5 value corresponding to a permission query request when the permission query request based on any user is received comprises:
obtaining a staff identification number and a function module identifier carried by the permission query request when a permission query request based on any user is received, wherein the function module identifier is generated based on a function module used by the user when the permission query request is sent out;
determining the role of the user according to the staff identification number and the function module identifier; and
obtaining, from the third data table, an MD5 value corresponding to the staff identification number of the user and the role, and outputting the MD5 value as an MD5 value corresponding to the permission query request.

16. The user permission data query method according to claim 2, wherein the step of screening and obtaining various MD5 values that are different from each other, and obtaining management departments and management staffs respectively corresponding to each of the screened MD5 values based on the first data table, the second data table, and the third data table comprises:
traversing a department structure tree that comprises an organizational structure relationship to obtain subordinate departments of each of the management departments, and storing a correspondence relationship among each of the management departments and the subordinate departments of each of the management departments into a sixth data table;
obtaining, from the sixth data table, subordinate departments of each of the management departments based on the management departments respectively corresponding to the screened various MD5 values; and
determining, in the first data table, the management staffs respectively corresponding to the screened various MD5 values according to the management departments and the subordinate departments respectively corresponding to the screened various MD5 values.

17. The electronic device according to claim 7, wherein the step of screening and obtaining various MD5 values that are different from each other, and obtaining management departments and management staffs respectively corresponding to the screened various MD5 values based on the first data table, the second data table, and the third data table comprises:
traversing a department structure tree that comprises an organizational structure relationship, to obtain subordinate departments of each of the management departments, and storing a correspondence relationship among each of the management departments and the subordinate departments thereof into a sixth data table;
obtaining, from the sixth data table, each subordinate department of each management department based on the management departments respectively corresponding to the screened various MD5 values; and
determining, in the first data table, the management staffs respectively corresponding to the screened various MD5 values according to the management departments and the subordinate departments respectively corresponding to the screened various MD5 values.

18. The non-transitory computer readable storage medium according to claim 12, wherein the step of screening and obtaining various MD5 values that are different from each other, and obtaining management departments and management staffs respectively corresponding to the screened various MD5 values based on the first data table, the second data table, and the third data table comprises:
- traversing a department structure tree that comprises an organizational structure relationship, to obtain subordinate departments of each of the management departments, and storing a correspondence relationship among each of the management departments and the subordinate departments thereof into a sixth data table;
- obtaining, from the sixth data table, each subordinate department of each management department based on the management departments respectively corresponding to the screened various MD5 values; and
- determining, in the first data table, the management staffs respectively corresponding to the screened various MD5 values according to the management departments and the subordinate departments respectively corresponding to the screened various MD5 values.

* * * * *